United States Patent
Goossens

[11] Patent Number: 5,409,304
[45] Date of Patent: Apr. 25, 1995

[54] ELECTROMAGNETIC VALVE, IN PARTICULAR FOR HYDRAULIC BRAKING SYSTEMS PROVIDED WITH A SLIP CONTROL

[75] Inventor: Andre F. L. Goossens, Rumst, Belgium

[73] Assignee: Aldred Teves Metallwarenfabrik GmbH & Co., HG, Germany

[21] Appl. No.: 62,356

[22] Filed: May 13, 1993

[51] Int. Cl.$^6$ ............................................. B60T 8/34
[52] U.S. Cl. .............................. 303/119.2; 137/596.17
[58] Field of Search ............... 303/119.2; 251/129.18, 251/129.02; 137/596.17, 884

[56] References Cited

U.S. PATENT DOCUMENTS

| | | | |
|---|---|---|---|
| 4,860,794 | 8/1989 | Parrott et al. | 303/119.2 |
| 4,929,038 | 5/1990 | Reinartz et al. | 303/119.2 |
| 5,076,538 | 12/1991 | Mohr et al. | 303/119.2 |

FOREIGN PATENT DOCUMENTS

| | | | |
|---|---|---|---|
| 3729216 | 3/1989 | Germany. | |
| 4028447 | 3/1992 | Germany | 303/119.2 |
| 9205989 | 4/1992 | WIPO | 303/119.2 |

Primary Examiner—Matthew C. Graham
Attorney, Agent, or Firm—Dykema Gossett

[57] ABSTRACT

The present invention is concerned with an electromagnetic valve secured in which, at least in friction-locking way, between a casing bore of a valve-accommodating member and a bushing is a valve sleeve. To provide an electromagnetic valve comprising a particularly simple self-centering of the valve needle and enabling a particularly safe, high-loadable and tight fixation of the valve sleeve within the valve-accommodating member, the casing bore is configured as a stepped bore in which is inserted a valve supporting-member accommodating the bushing with the valve sleeve and being provided with pressure fluid passageways and a centering member.

1 Claim, 1 Drawing Sheet

ELECTROMAGNETIC VALVE, IN PARTICULAR FOR HYDRAULIC BRAKING SYSTEMS PROVIDED WITH A SLIP CONTROL

BACKGROUND OF THE INVENTION

The present invention relates to an electromagnetic valve, and more particularly to an electromagnetic valve for use with hydraulic braking systems and slip controls.

In conventionally used electromagnetic valves of the type as disclosed, for example, by DE-OS 37 29 216, valve sleeves are inserted in a valve casing or housing configured as a steel valve block, and caulked therein. When using magnetic valves closed in a de-energized basic condition, the valve sleeve forms the actual magnetic core of a magnet coil. Located in the interior of the valve sleeve is a hold-on magnet which actuates a valve needle, along with a guide thereof. However, when using electromagnetic valves open in a de-energized basic condition, it is a bushing inserted at the point where the valve sleeve is caulked to the valve casing that operates as the magnetic core.

The caulking, impressed with the aid of a tool in a substantially nose-type form in the valve block casing, will then establish a connection through frictional resistance to the valve sleeve clamped between the valve casing and the bushing.

It is especially under consideration of the relatively high hydraulic test pressures within the valve sleeve, that the conventional caulking of the valve sleeve within the valve casing is considered to require improvement to prevent the valve sleeve from slipping out and the valve casing from being damaged as a result of enhanced shear stress between the faces of contact. In addition, the direct fixation of the valve sleeve within the valve casing requires employment of tough and high-strength steels that can be correspondingly re-shaped. Moreover, the high-precision manufacturing of a casing bore of the valve casing and the precise orientation of the valve needle by means of a centering member within the casing bore vis-Á-vis a valve seat, as well as the force-locking fixation of the centering member are considered as requiring substantial efforts.

It is, therefore, an object of the present invention to provide an easy-to-manufacture electromagnetic valve comprising a self-centering means of the valve needle over the valve seat and enabling a particularly safe, high-loadable and tight attachment of the valve sleeve within a valve-accommodating member. Another object of the invention is the low-cost manufacture of a pressure fluid supply to the electromagnetic valve.

SUMMARY OF THE INVENTION

The present invention relates to an electromagnetic valve that is easily manufactured, self-centering, and enables a particularly safe, high loadable and tight attachment between valve sleeve and a valve-accommodating member. In particular, an electromagnetic valve constructed according to the present invention is intended for use with hydraulic braking systems and slip controls.

A disclosed electromagnetic valve includes a casing bore of a valve-accommodating member that is formed as a stepped bore, and a valve-supporting member or body intended to be disposed within the stepped bore of the valve-accommodating member. The valve-supporting member accommodates a bushing with a valve sleeve and is provided with pressure-fluid passageways and a centering member. The valve-accommodating member and the valve-supporting member confine an annular casing chamber which defines a pressure fluid passageway, thereby insuring in a simple way, by correspondingly forming the casing bore and the valve-supporting member, a reliable fixation of the valve and of the pressure fluid supply to the valve.

BRIEF DESCRIPTION OF THE DRAWINGS

The various features and inventive aspects of the present invention will become more apparent upon reading the following detailed description and claims together with the drawing, wherein reference numerals identify corresponding components, and:

DETAILED DESCRIPTION OF TEE PREFERRED EMBODIMENTS

Figure 1:
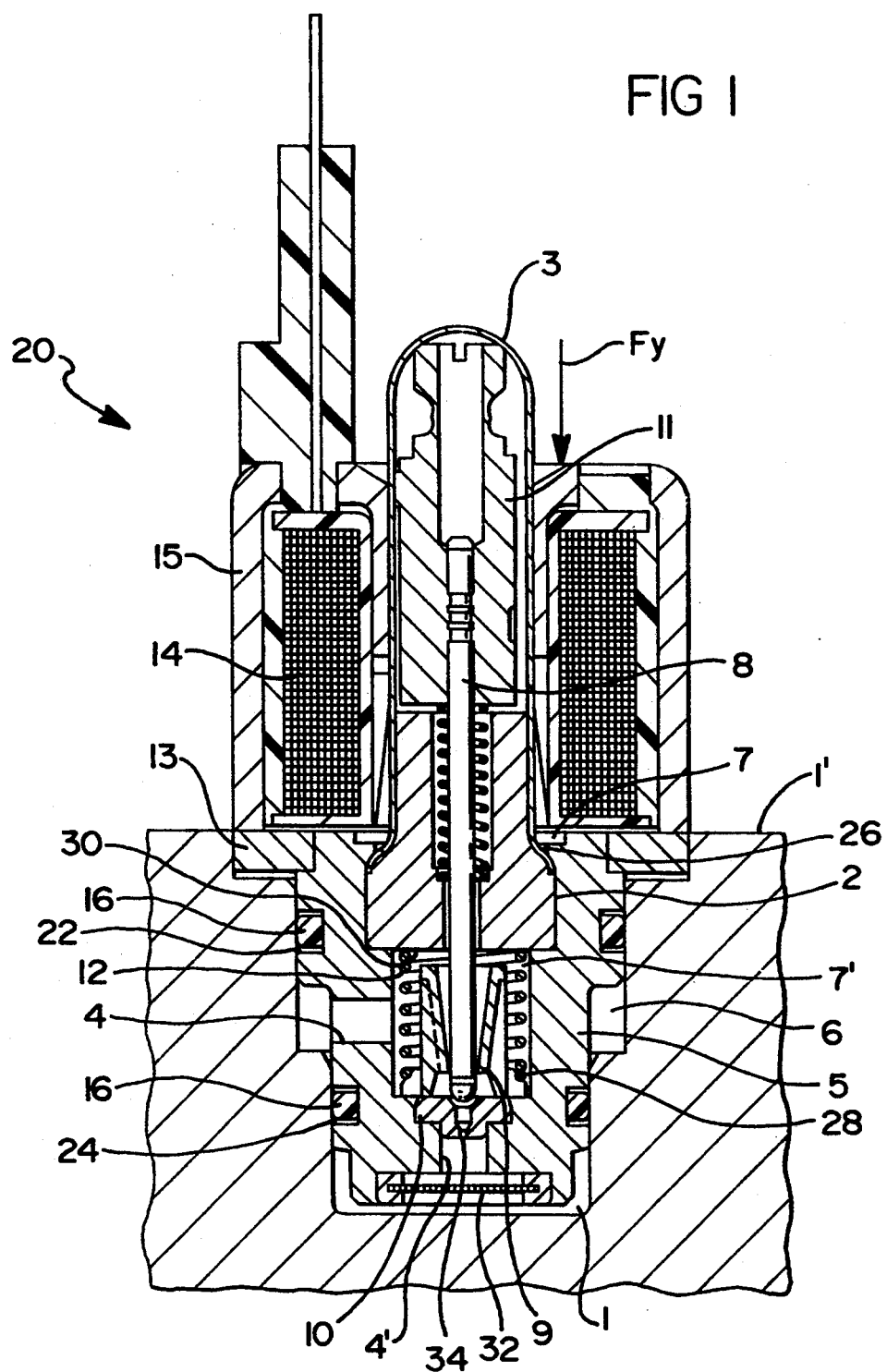
FIG. 1 is a cross-sectional view of an embodiment according to the present invention.

FIG. 1 shows a cross-sectional view of an electromagnetic valve 20 open in the basic position. The electromagnetic valve 20 is contained in a block-shaped valve-accommodating member or body 1. The electromagnetic valve 20 comprises a valve supporting-member 5 inserted in a stepped casing bore 1 of the valve-accommodating member 1'. Valve supporting member 5 accommodates a bushing 2 with a valve sleeve 3, which, for sealing the pressure fluid passageways 4,4' provided in the casing bore 1, is furnished with two peripheral grooves 22, 24 for the accommodation of seals 16. At least in a friction locking way, valve sleeve 3 is fixed within casing bore 1, with a hold-on magnet 11 enclosed by valve sleeve 3 performing a stroke movement in response to a magnetic coil 14 which is provided on the valve sleeve 3 and to which current is applied, such that a valve needle 8 molded to the hold-on magnet 11 and partially enclosed by bushing 2, acting as a magnetic core, is able to communicate with a valve seat 10 fixed within the valve-accommodating member 1'. Valve-supporting member 5 comprises a stepped bore 26 in an area of larger cross-section 7 of which is held the bushing 2 with the valve sleeve 3.

The valve supporting member 5, as regards the dimensions thereof, is so adapted to the stepped casing bore 1 that, as a result of the relatively great bore depth, an annular casing chamber 6 is left facing the narrower flange of the valve supporting member 5 enclosing the bushing 2, which annular casing chamber 6 favors, through the pressure fluid passageway 4 of the valve supporting member configured as a transverse bore 4, the pressure fluid communication between the pressure fluid passageway 4' located, in the drawing, below the valve needle 8, and the pressure fluid passageway 4 in communication with the annular casing chamber 6.

The valve needle 8, by means of a centering member 9, is in coaxial alignment with the valve seat 10. Centering member 9 is inserted in an area of a smaller opening cross-section 7' of the stepped bore 26 of the valve-supporting member 5. Centering member 9 is in abutment with the area of the valve supporting member accommodating the valve seat 10. For this purpose, a compression spring 12 is put over the centering member 9 embracing the valve needle 9 in a funnel-shaped way (i.e., centering member 9 having a funnel shaped interior), with the compression spring 12 being supported on a flange or front face 28 of the centering member 9 and on a front face 30 of the bushing 2 facing away from the hold-on magnet. Feasibly, the centering member 9 is provided with openings that are located between a plural number of bridges and are surrounded by a filter fabric masking the openings. Equally, the pressure fluid passageway 4' terminating, in the drawing, below the valve seat 10, is provided with a fine filter 32, thereby avoiding the ingress of dirt towards a passage opening 34 in the valve seat 10. As the compression spring 12 acting upon the centering member 9 only can take up longitudinal rather than transverse forces, the centering member 9 inserted with radial play in the small opening cross-section 7', at an initial transverse displacement of the valve needle 8, centers itself advantageously vis-Á-vis the valve seat 10 in that the centering member 9 is coaxially aligned with the valve seat 10 through the transverse force transferred from the valve needle 8 to the centering member 9 while exposed to some minor counter-force caused by the frictional force effective at the abutment surface of the centering member 9. Finally, the friction force generated on the flange of the centering member 9 by the spring force and the coefficient of friction insures that the self-centering valve needle position is maintained.

A particularly advantageous fixation of the electromagnetic valve 20 within the valve-accommodating member 1' is achieved by a contact force Fy, for example, transferable by means of a holding member securable to the valve-accommodating member 1' by a conventional fastener preferably by means of a plate or lid not shown in the drawing. Force Fy exerted on a coil casing 15 enclosing the magnetic coil 14, resulting in that the force admitted to the coil casing 15, through a pressure plate 13 superposed on the flange of the valve-supporting member 5, will fix the electromagnetic valve 20 within the valve-supporting member 5, accommodating member 1'.

All of the afore-described components, substantially, are of a rotation-symmetrical configuration and are coaxially oriented with respect to one another. The depth dimensions of the stepped bore 1 within the valve-accommodating member 1' vis-Á-vis the stepped length of the valve-supporting member 5 are to be selected larger such that adequate axial play will be maintained at any time.

Additional embodiments of the principle of the invention are within the scope of the claims. The invention applies to all pressure control valves requiring special measures for centering the valve needle and for fixing the valve within the accommodating member.

I claim:
1. An annular electromagnetic valve comprising:
   a valve-accommodating body with a stepped casing bore;
   a valve-supporting body with a stepped bore, said supporting body being press-fitted is said casing bore of said accommodating body;
   a valve sleeve;
   a bushing, said bushing held in said stepped bore of said supporting body in conjunction with said sleeve, said bushing having a front face;
   a valve needle, said needle adapted to perform a stroke movement along a longitudinal axial axis and being partially enclosed by said bushing, selectively extending into said stepped bore of said supporting body;
   a valve seat fixed in said casing bore by said supporting body, said valve seat adapted to communicate with said valve needle;
   a first pressure fluid passageway located outwardly of said valve needle and adjacent said valve seat;
   a second pressure fluid passageway configured as a generally transverse extending bore in said valve supporting body, said first and second passageways being in selective fluid communication;
   a centering member, said centering member being received within said stepped bore of said valve-supporting body, said centering member sized relative to said stepped bore of said valve-supporting body for radial play therein, said centering member having a funnel shaped interior for embracing said valve needle and for bringing said valve needle and said valve seat into coaxial alignment, said centering member having a flange;
   a compression spring being supported at a first end on said flange of said centering member and on a second end on said front face of said bushing for maintaining said coaxial alignment of said valve needle and said valve seat; and
   an annular casing chamber defining a third fluid passageway, said annular chamber confined by correspondingly forming said casing bore and said valve-supporting body.

* * * * *